United States Patent
Pearce

(10) Patent No.: US 7,318,260 B2
(45) Date of Patent: Jan. 15, 2008

(54) QUICK RELEASE LOCKING MECHANISM AND METHOD, ESPECIALLY FOR A HIDDEN-TYPE CONVERTIBLE SHOE

(75) Inventor: Frank Gerald Pearce, Richardson, TX (US)

(73) Assignee: Convertible Shoe, LLC, Troy, MI (US)

( * ) Notice: Subject to any disclaimer, the term of this patent is extended or adjusted under 35 U.S.C. 154(b) by 0 days.

(21) Appl. No.: 11/214,271

(22) Filed: Aug. 29, 2005

(65) Prior Publication Data
US 2006/0080813 A1 Apr. 20, 2006

Related U.S. Application Data

(60) Provisional application No. 60/619,659, filed on Oct. 18, 2004.

(51) Int. Cl.
*A43C 13/00* (2006.01)
*A43B 13/36* (2006.01)

(52) U.S. Cl. ............... 24/681; 24/662; 24/108; 24/110; 403/361; 403/381; 12/142 T

(58) Field of Classification Search ........... 24/102.52, 24/107–110, 578.13, 578.15, 581.1, 591.1, 24/594.1, 594.11, 595.1, 598.1; 12/142 S, 12/142 T; 36/101; 403/360, 361, 381
See application file for complete search history.

(56) References Cited

U.S. PATENT DOCUMENTS

| | | | |
|---|---|---|---|
| 1,232,321 A | | 3/1917 | Soucek |
| 1,550,006 A | * | 8/1925 | Carlson ............... 24/110 |
| 1,563,350 A | * | 12/1925 | Field et al. ............ 24/110 |
| 1,566,023 A | * | 12/1925 | Kuehner ............... 24/110 |
| 1,661,520 A | * | 3/1928 | Wullum ............... 24/110 |
| 1,823,229 A | * | 9/1931 | Balbaud ............... 24/662 |

(Continued)

FOREIGN PATENT DOCUMENTS

| | | |
|---|---|---|
| DE | 1 279 295 | 10/1968 |
| EP | 0 888 729 A1 | 1/1999 |
| GB | 713290 | 8/1954 |
| GB | 1 232 321 | 5/1971 |
| GB | 2 143 420 A | 2/1985 |
| WO | WO 03/075696 A1 | 9/2003 |

*Primary Examiner*—Jack W. Lavinder
(74) *Attorney, Agent, or Firm*—Brooks Kushman P.C.

(57) ABSTRACT

A novel quick release locking mechanism is disclosed. The locking mechanism is comprised of a male latch member and a female receptacle. The male latch member is comprised of an arbor with a planar handle at its proximal end and a catch apparatus at its distal end. The arbor is further equipped with a slidable annulus that moves between the lower margin of the planar handle and the catch apparatus. The female receptacle is comprised of a housing and a duality of notched resilient arms. Operation of the locking mechanism is achieved by introduction of the male latch member into the female receptacle with sufficient force to urge open the resilient arms which then springably close around the catch means, thus locking the mechanism. The female receptacle is further supplied with appropriate stops to prevent separation forces from inducing upward travel of the resilient arms during use, thus increasing lock strength and durability. Unlocking is achieved by pressing the male latch member further into the female receptacle such that the resilient arms are urged open by the slidable annulus which is then pressure captured in the resilient arm notches. The male latch member is then retracted. During retraction, the catch means dislodge the slidable annulus thus allowing full separation of the male latch member from the female receptacle.

19 Claims, 2 Drawing Sheets

U.S. PATENT DOCUMENTS

| | | | |
|---|---|---|---|
| 2,430,338 | A | 11/1947 | Heiman |
| 2,510,236 | A | 6/1950 | Kutcher |
| 2,873,540 | A | 2/1959 | Murphy |
| 2,944,241 | A * | 7/1960 | Londell, Jr. ............... 439/357 |
| 3,032,896 | A | 5/1962 | Weaver |
| 3,099,884 | A | 8/1963 | Kixmiller et al. |
| 3,167,835 | A | 2/1965 | Bengtsson |
| 3,376,616 | A | 4/1968 | Kaczorowski |
| 3,436,844 | A | 4/1969 | Sachs |
| 3,902,259 | A | 9/1975 | Cracco |
| 3,983,642 | A | 10/1976 | Liao |
| 4,035,877 | A | 7/1977 | Brownson et al. |
| 4,110,873 | A | 9/1978 | Verchere |
| 4,114,296 | A | 9/1978 | Smith |
| 4,172,330 | A | 10/1979 | Kao |
| 4,193,214 | A | 3/1980 | Wang |
| 4,267,649 | A | 5/1981 | Smith |
| 4,363,177 | A | 12/1982 | Boros |
| 4,439,935 | A | 4/1984 | Kelly |
| 4,450,633 | A | 5/1984 | Connelly |
| 4,461,102 | A | 7/1984 | De Vincentis |
| 4,682,688 | A | 7/1987 | Budert |
| 4,688,337 | A | 8/1987 | Dillner et al. |
| 4,802,266 | A | 2/1989 | Doty et al. |
| 4,805,320 | A | 2/1989 | Goldenberg et al. |
| 4,839,948 | A | 6/1989 | Boros |
| 4,887,369 | A | 12/1989 | Bailey et al. |
| 4,998,329 | A | 3/1991 | Boros |
| 5,018,252 | A | 5/1991 | Butler |
| 5,339,543 | A | 8/1994 | Lin |
| 5,381,610 | A | 1/1995 | Hanson |
| 5,533,280 | A | 7/1996 | Halliday |
| 5,896,684 | A | 4/1999 | Lin |
| 5,983,528 | A | 11/1999 | Hartung |
| 5,991,950 | A | 11/1999 | Schenkel |
| 5,992,058 | A | 11/1999 | Jneid |
| 6,086,449 | A | 7/2000 | Sharp |
| 6,154,936 | A | 12/2000 | Howell et al. |
| 6,176,660 | B1 | 1/2001 | Lewis et al. |
| 6,349,486 | B1 | 2/2002 | Lin |
| 6,418,643 | B1 | 7/2002 | Yang |
| 6,430,846 | B1 | 8/2002 | Lin |
| 6,442,870 | B1 | 9/2002 | Tsai |
| 6,533,515 | B2 | 3/2003 | Meyer |
| 6,581,255 | B2 | 6/2003 | Kay |
| 6,640,373 | B2 | 11/2003 | Tsai |
| 6,651,359 | B1 | 11/2003 | Bricker |
| 2002/0124434 | A1 | 9/2002 | Hsin et al. |
| 2002/0174569 | A1 | 11/2002 | Tsai |
| 2002/0194750 | A1 | 12/2002 | Feick |

* cited by examiner

QUICK RELEASE LOCKING MECHANISM AND METHOD, ESPECIALLY FOR A HIDDEN-TYPE CONVERTIBLE SHOE

PRIORITY

The present application claims priority under 35 USC 119 based upon provisional application 60/619,659 filed on Oct. 18, 2004.

TECHNICAL FIELD

The present invention relates generally to locking mechanisms and more particularly to a hidden-type locking mechanism that is especially useful for a convertible shoe that allows a consumer to easily remove a shoe upper and replace it for uppers of different styles, functionality, and colors.

BACKGROUND OF THE INVENTION

Manufacturers and retailers have long known the value of a convertible shoe that allows a consumer to detachably secure a plurality of shoe uppers to a single pair of shoe soles. In addition to the economic advantage of replacing numerous pairs of shoes with a single pair of shoe soles and a variety of uppers, such a shoe has other advantages, including conservation of space during travel. Prior attempts to produce such a shoe have not been successful in that they suffer from many disadvantages, including complexity of manufacture, difficulty of use, unreliability, and unconventional appearance. Such attempts have included efforts to attach shoe uppers to a shoe sole using snap fasteners, such as in U.S. Pat. No. 5,992,058 to H. Jneid, and using zippers, such as in U.S. Pat. No. 5,983,528 to P. Hartung. These attempts failed to provide functionality in that they are overly complex and do not provide a hidden-type connection. Recent embodiments for a convertible shoe have attempted to substantially hide the connection between vamp and sole, including U.S. Pat. No. 6,349,486 to G. Lin utilizing clips and U.S. Pat. No. 6,430,846 to G. Lin using a pushbutton locking mechanism. Yet, such attempts have not adequately solved the problem of ease of manufacturing while providing secure locking, hidden view, and facility of use by the consumer. For example, the patent to Lin requires difficult and expensive manufacturing techniques to insure that the push button is accurately positioned and to prevent foaming material from fouling the internal components. In addition, the push button is visible, or, if attempted to be hidden, presents substantial manufacturing difficulty and increased costs. Furthermore, such mechanisms must be located along the outer perimeter of the shoe sole such that the pushbutton is accessible, thus preventing its application to thong style shoe designs in which one upper connection is positioned toward the center and away from the perimeter of the shoe sole.

OBJECTS OF THE INVENTION

One object of the invention is to improve the versatility and function of locking mechanisms for fastening materials or objects.

Another object of the invention is to improve locking mechanisms that can be substantially hidden from view during use.

An additional object is to improve the appearance and operation of locking mechanisms by eliminating external release members while providing secure and reliable locking function.

A further object of the invention is to improve hidden-type locking mechanisms for a convertible shoe.

Still another object is to reduce the complexity of hidden-type locking mechanisms for ease of manufacturing and reduction of costs.

DISCLOSURE OF THE INVENTION

With the limitations of the previous attempts in mind, the present invention provides an improved locking mechanism that overcomes the deficiencies recited above. The present invention has numerous applications, including but not limited to accessories such as belts and purses as well as utility items such as containers, luggage, and the like. The invention is especially useful for a hidden-type convertible shoe since no external release buttons or levers are utilized, thus simplifying the manufacturing process and improving both function and aesthetic appeal.

The locking mechanism of the present invention is comprised of a male latch member and a female receptacle. The male latch member includes an arbor with a planar handle at its proximal end and a catch apparatus at its distal end. A slidable annulus is permanently mounted to the arbor and moves between the catch apparatus and the lower margin of the planar handle. Locking of the mechanism is achieved by pressing the male latch member into the female receptacle such that the resilient arms open and then springably close behind the catch apparatus. Separation forces tending to induce upward motion of the resilient arms during use are resisted by stops along the top perimeter of the female receptacle. Unlocking is achieved by pressing the male latch member further into the female receptacle such that the slidable annulus first urges open the resilient arms and is then removably pressure captured in the resilient arm notches. The male latch member is then retracted. During retraction of the male latch member, the slidable annulus is dislodged by the catch apparatus, thus allowing for complete separation of the male latch member from the female receptacle.

The locking mechanism of the present invention is ideal for mass production through plastic injection molding using a variety of plastic materials, including polyoxymethylene and nylon resins and their polymers to form the female receptacle, male latch member, and slidable annulus, such that optimum operation, strength, and durability are achieved.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION

Figure 1:
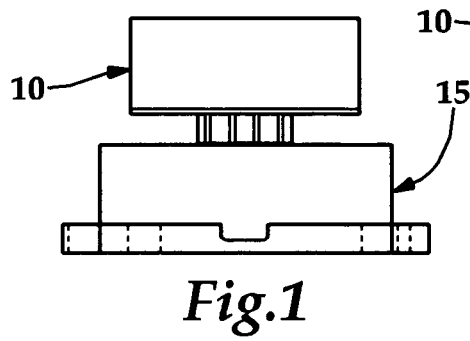
FIG. 1 is an elevation front view of the latch mechanism of the present invention.
Figures 2, 3:
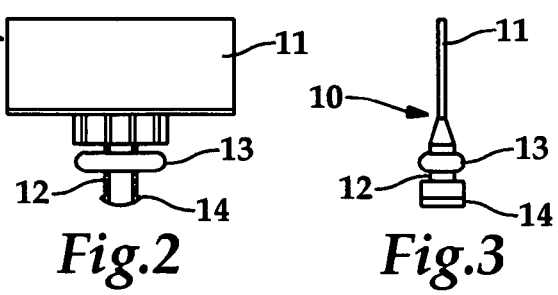
FIG. 2 is an elevation front view of the male latch member of the present invention.
FIG. 3 is an elevation side view of the male latch member of the present invention.
Figure 4:
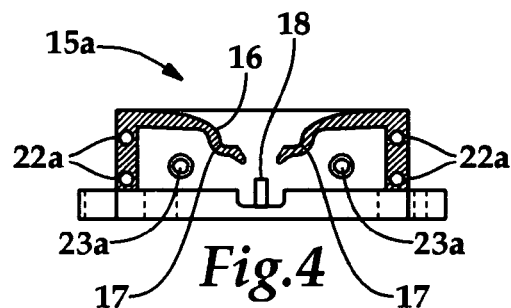
FIG. 4 is a sectional view of the female receptacle of the present invention.
Figure 5:
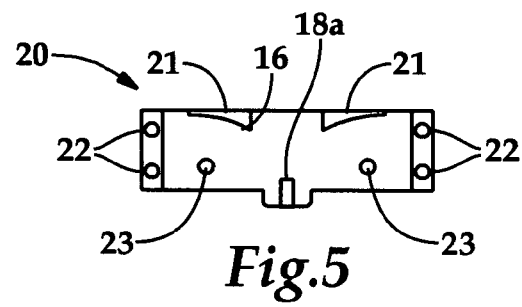
FIG. 5 is an elevation front view of the female receptacle cover with stops.
Figure 6:
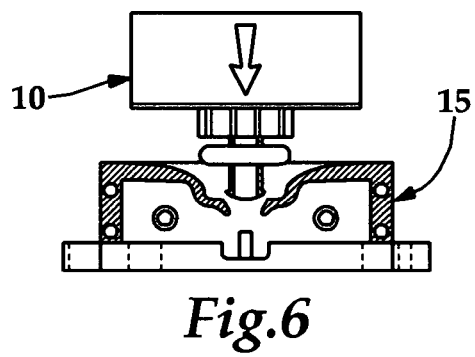
FIG. 6 is a sectional view of the male latch member entering the female receptacle.
Figure 7:
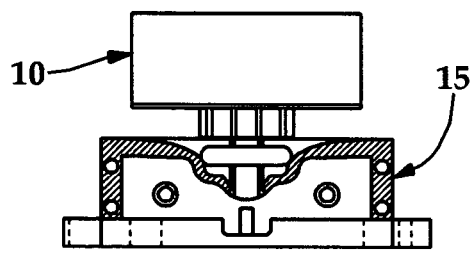
FIG. 7 is a sectional view of the male latch member fully seated in the female receptacle.
Figure 9:
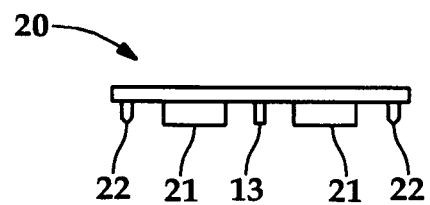
FIG. 9 is a top view of the female receptacle cover with stops.

Referring to the drawings, and specifically to FIG. 1, the present invention includes a locking mechanism comprised of a female receptacle 15 and a male latch member 10. Now referring to FIGS. 4 and 5, the female receptacle 15 is comprised of a primary housing 15A to house the female receptacle 15 and which is shown as a rectangle, insertion guide 18 which is formed in the bottom of the female receptacle, and resilient arms 16 with capture notches 17 to hold the male latch member 10. A cover 20 to hold together the female receptacle 15 is fitted with insertion guide 18A and has integral stops 21 along the top perimeter of cover 20. The cover 20 is further fitted with pins 22 and 23 for insertion into registers 22A and 23A of the primary housing 15A to effect complete assembly of the female receptacle. Referring now to FIGS. 2 and 3, the male latch member 10 is comprised of an arbor 12 with planar handle 11 at its proximal end and catch apparatus 14 at its distal end. A slidable annulus 13 is mounted to the arbor 12 and moves between the catch apparatus 14 and lower margin of the planar handle 11. Now referring to FIGS. 6 and 7, locking of the mechanism is achieved by pressing the male latch member 10 into the female receptacle 15 such that resilient arms 16 are urged open by, and then springably close behind, the catch apparatus 14. Stops 21 as shown in FIG. 5 prevent upward travel of the resilient arms 16 tending to be induced by separation forces while the locking mechanism is in use. FIG. 9 shows the stops 21 with a cavity for the catch apparatus 14 of the male latch member 10 forming the top of cover 20.

Figure 8:
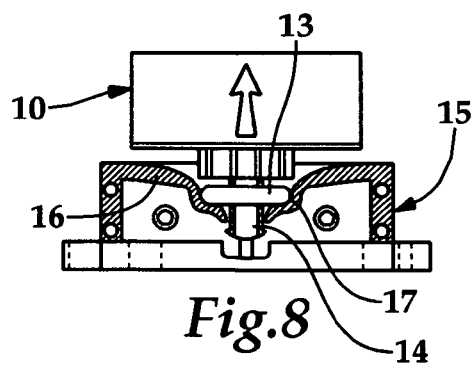
FIG. 8 is a sectional view of the male latch member being retracted from the female receptacle.

Referring now to FIG. 8, unlocking of the mechanism is achieved by pressing the male latch member 10 further in the first direction into the female receptacle 15 such that the slidable annulus 13 urges open the resilient arms 16, is pressure captured in the resilient arm notches 17, and is dislodged by catch means 14 during upward withdrawal in the second direction of the male latch member 10, thus completely unlocking the mechanism.

Figure 10:
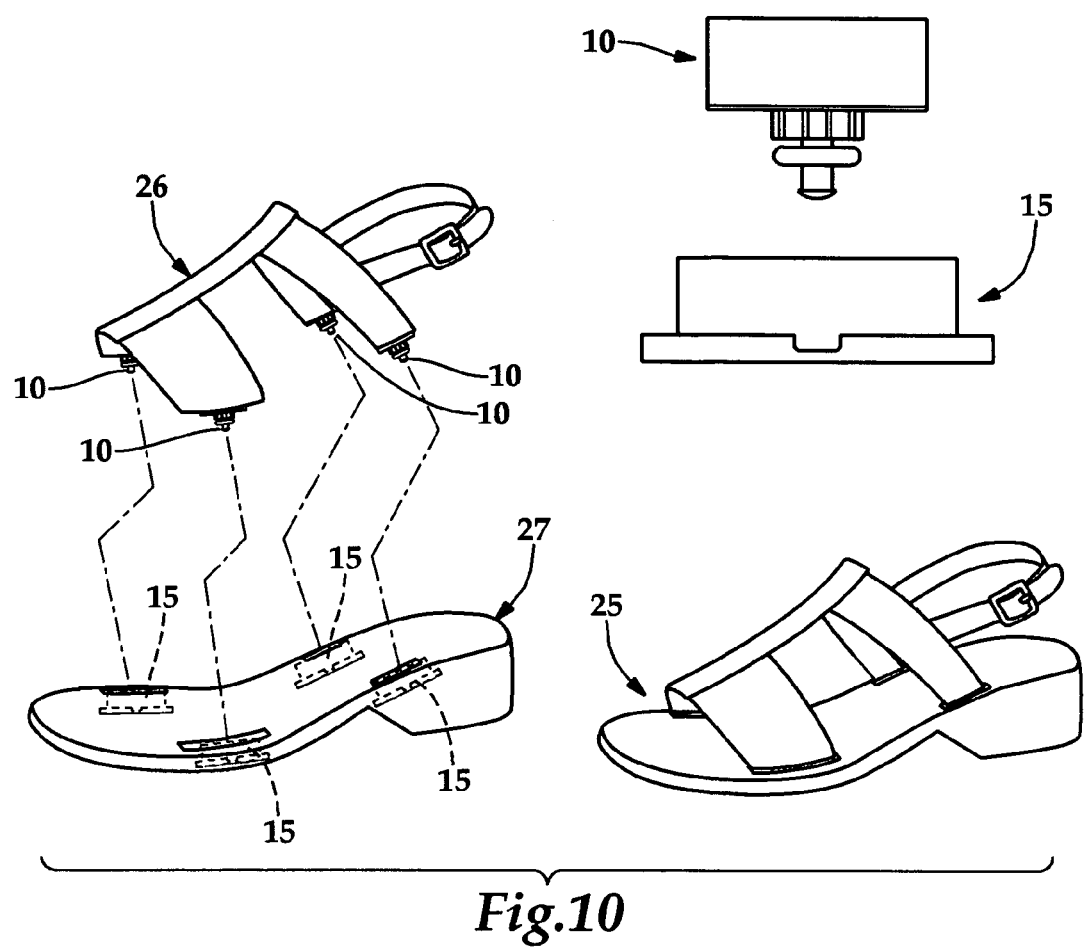
FIG. 10 is a plan view of the embodiment of the present invention in a convertible shoe.

In the embodiment shown in FIG. 10, a plurality of female receptacles 15 are embedded permanently in a shoe sole 27 and a corresponding number of male latch members 10 are affixed to the lower perimeter of the shoe upper 26 at their planar handles 11. In this embodiment, the shoe upper 26 is detachably mounted to the shoe sole 27 such that uppers of various styles, colors, and functionality may be engaged with a single pair of shoe soles. To facilitate a hidden-type connection, the top surfaces of the female receptacles 15 are recessed into the shoe sole 27 such that when the uppers 26 are mounted to the sole 27, that portion of the upper attached to the planar handle 11 of the male latch member 10 resides substantially below the top surface of the shoe sole 27, thus giving the fully assembled convertible shoe 25 the appearance of a conventional shoe.

Referring now to FIGS. 1 through 10, engagement of the shoe upper 26 to the shoe sole 27 is accomplished by grasping that portion of the upper affixed to the planar handle 11 and pressing the male latch member 10 into the female receptacle 15 in the first direction. Locking may be indicated by an audible clicking sound that signals that the catch apparatus 14 has been captured by the resilient arms 16. Disengagement is achieved by grasping the upper 26 at the planar handle 11 and pushing the male latch member 10 deeper into the female receptacle 15 in the first direction, thus forcing the slidable annulus 13 to urge open the resilient arms 16. During this action, the slidable annulus 13 is removably captured by the resilient arm notches 17. An audible clicking sound may signal that the slidable annulus 13 has been captured. The male latch member 10 is then withdrawn in the second direction as previously described. This embodiment provides a secure, hidden-type connection that can be easily and quickly engaged and disengaged, while providing the appearance and aesthetic appeal of a conventional shoe.

Although preferred embodiments of the invention have been described in the foregoing detailed description and illustrated in the accompanying drawings, it will be understood that the invention is not limited to the embodiments disclosed, and particularly to shoe applications, but is capable of rearrangements, modifications, and substitution of parts and elements as well as use in numerous devices requiring a quick release locking mechanism. The present invention is therefore intended to encompass such rearrangements, modifications and substitutions of parts and elements as fall within the spirit and scope of the invention.

The invention claimed is:

1. A locking apparatus, comprising:
   a female receptor for locking with a male member;
   said male member locking with said female receptor by moving said male member with respect to said female receptor in a first direction;
   said male member being unlocked from said female receptor by moving said male member an additional distance further in said first direction; and
   said female receptor includes resilient arms to hold and release said male member and a stop to prevent movement of said resilient arms in a second direction.

2. A locking apparatus as in claim 1, wherein a portion of said resilient arms contacts said stop while preventing movement of said resilient arms in said second direction.

3. A locking apparatus as in claim 1, wherein said resilient arms include a curved portion to release said male member.

4. A locking apparatus as in claim 1, wherein said female receptor includes an insertion guide.

5. A locking apparatus as in claim 1, wherein said male member includes a slidable member to release said male member.

6. A locking apparatus as in claim 5, wherein said male member includes an arbor to allow said slidable member to slide along said arbor.

7. A locking apparatus as in claim 1, wherein the material forming said female receptor includes one or more plastics selected from the group consisting of polyoxymethylene, acetal, polytrioxame, and polyformaldehyde.

8. A locking apparatus as in claim 1, wherein the material forming said male member includes one or more plastics selected from the group consisting of polyamides and nylon.

9. A locking apparatus as in claim 1, wherein said male member includes a catch apparatus to engage said resilient arms to lock said male member to said female receptor.

10. A locking apparatus as in claim 1, wherein said male member is unlocked from said female receptor without rotational movement of said female receptor relative to said first direction.

11. A locking apparatus as in claim 1, wherein said first direction is a downward direction and said second direction is an upward direction substantially opposing said downward direction.

12. A method for producing a locking apparatus, comprising the steps of:
forming a female receptor and a male member;
locking said male member with said female receptor by moving said male member with respect to said female receptor in a first direction; and
unlocking said male member from said female receptor by moving said male member an additional distance further in said first direction without rotational movement of said female receptor relative to said first direction,
wherein the step of forming said female receptor includes forming resilient arms to hold and release said male member and forming a stop to prevent movement of said resilient arms in a second direction.

13. A method for producing a locking apparatus as in claim 12, wherein said method includes the step of forming said male member includes forming a slidable member to release said male member.

14. A method for producing a locking apparatus as in claim 13, wherein the step of forming said male member includes forming an arbor to allow said slidable member to slide along said arbor.

15. A method for producing a locking apparatus as in claim 12, wherein the step of forming said resilient arms includes forming a curved portion to release said male member.

16. A method for producing a locking apparatus as in claim 12, wherein the step of forming said female receptor includes forming an insertion guide.

17. A method for producing a locking apparatus as in claim 12, wherein the step of forming said male member includes forming a catch apparatus to engage said resilient arms to lock said male member to said female receptor.

18. A locking apparatus, comprising:
a female receptor for locking with a male member;
said male member locking with said female receptor by moving said male member with respect to said female receptor in a first direction;
said male member being unlocked from said female receptor by moving said male member an additional distance further in said first direction; and
said female receptor includes resilient arms to hold and release said male member and a stop to prevent movement of said resilient arms in a second direction,
wherein said locking apparatus locks a portion of a shoe.

19. A locking apparatus as in claim 18, wherein said locking apparatus is hidden when locked to the portion of the shoe.

* * * * *